United States Patent
Kurihara et al.

(10) Patent No.: US 12,467,652 B2
(45) Date of Patent: Nov. 11, 2025

(54) AIR CONDITIONER, CONTROL METHOD, AND NON-TRANSITORY COMPUTER-READABLE STORAGE MEDIUM

(71) Applicant: Mitsubishi Electric Corporation, Tokyo (JP)

(72) Inventors: Makoto Kurihara, Tokyo (JP); Masahiro Kamijo, Tokyo (JP)

(73) Assignee: Mitsubushi Electric Corporation, Tokyo (JP)

( * ) Notice: Subject to any disclaimer, the term of this patent is extended or adjusted under 35 U.S.C. 154(b) by 94 days.

(21) Appl. No.: 18/247,312

(22) PCT Filed: Feb. 10, 2021

(86) PCT No.: PCT/JP2021/004948
§ 371 (c)(1),
(2) Date: Mar. 30, 2023

(87) PCT Pub. No.: WO2022/172357
PCT Pub. Date: Aug. 18, 2022

(65) Prior Publication Data
US 2024/0003574 A1    Jan. 4, 2024

(51) Int. Cl.
*F24F 11/64* (2018.01)
*F24F 11/56* (2018.01)

(52) U.S. Cl.
CPC ............. *F24F 11/64* (2018.01); *F24F 11/56* (2018.01)

(58) Field of Classification Search
CPC .. F24F 11/64; F24F 11/56; F24F 11/58; F24F 11/65; G01C 21/3697; G01C 21/3694; G01C 21/3453; G08G 1/096741; G08G 1/096716
See application file for complete search history.

(56) References Cited

U.S. PATENT DOCUMENTS

| | | | |
|---|---|---|---|
| 10,648,684 B2 * | 5/2020 | Ito | G05D 23/1904 |
| 11,274,848 B2 * | 3/2022 | Fujiwara | F24F 11/49 |
| 11,906,182 B2 * | 2/2024 | Hui | F24F 11/49 |

(Continued)

FOREIGN PATENT DOCUMENTS

| | | | |
|---|---|---|---|
| CN | 104990213 A | 10/2015 | |
| EP | 3647673 A1 | 5/2020 | |

(Continued)

OTHER PUBLICATIONS

Office Action mailed Apr. 10, 2024 in corresponding Australian Patent Application No. 2021427809.

(Continued)

*Primary Examiner* — Jianying C Atkisson
*Assistant Examiner* — Meraj A Shaikh
(74) *Attorney, Agent, or Firm* — Posz Law Group, PLC

(57) ABSTRACT

An air conditioner performs air conditioning control according to settings. The air conditioner collects, from each of communication terminals, setting history information based on a history of a setting selected from among the settings by a user of a respective one of the communication terminals. The air conditioner performs air conditioning control corresponding to any of the settings based on the setting history information which is collected.

9 Claims, 8 Drawing Sheets

(56) References Cited

U.S. PATENT DOCUMENTS

| | | | | |
|---|---|---|---|---|
| 2015/0330652 A1* | 11/2015 | Kim | ......................... | H04W 4/70 |
| | | | | 700/276 |
| 2016/0275222 A1* | 9/2016 | Otsuki | .................... | G06F 30/20 |
| 2018/0100662 A1* | 4/2018 | Farahmand | ......... | G05B 19/0428 |
| 2019/0017720 A1* | 1/2019 | Otsuki | ..................... | F24F 11/65 |
| 2019/0377305 A1* | 12/2019 | Petrus | .................... | G05B 15/02 |
| 2020/0025402 A1* | 1/2020 | Bell | ......................... | F24F 11/64 |

FOREIGN PATENT DOCUMENTS

| | | | |
|---|---|---|---|
| JP | 108-225012 A | | 9/1996 |
| JP | 2005-127558 A | | 5/2005 |
| JP | 2014-085034 A | | 5/2014 |
| JP | 2016200373 A | * | 12/2016 |
| JP | 2019-011881 A | | 1/2019 |

OTHER PUBLICATIONS

International Search Report of the International Searching Authority mailed Apr. 27, 2021 in corresponding International application No. PCT/JP2021/004948 (and English translation).

Chinese Office Action mailed Jun. 10, 2025 in corresponding Chinese Patent Application No. 202180077760.0 (and English machine translation).

* cited by examiner

AIR CONDITIONER, CONTROL METHOD, AND NON-TRANSITORY
COMPUTER-READABLE STORAGE
MEDIUM

CROSS REFERENCE TO RELATED APPLICATION

This application is a U.S. national stage application of International Application No. PCT/JP2021/004948, filed on Feb. 10, 2021, the contents of which are incorporated herein by reference.

TECHNICAL FIELD

The present disclosure relates to an air conditioner, a control method, and a non-transitory computer-readable storage medium.

BACKGROUND

An air conditioner installed in space used by a plurality of people is operated by the plurality of users with respect to a set temperature, or the like. There are cases where such an air conditioner is operated mainly by a user who is close to a remote controller. Since a set temperature or the like differs depending on user's preference, if a limited number of users operate the air conditioner frequently, a setting will be biased toward the set temperature or the like desired by some users.

For example, Patent Document 1 discloses a technique of inquiring a communication terminal of each user to collect opinions such as "hot," "cold," and "just right," and controlling a set temperature based on the collected opinions.

Patent Document

[Patent Document 1] Japanese Patent Application Publication No. 2014-085034

However, the technique described in Patent Document 1 has required inquiring respective users for their opinions. Further, since requests from users only at the time of the users answering the inquires, or only requests from the users who answered the inquiries are reflected in settings of the air conditioner, it has been difficult to reflect constant preferences or the like of the respective users in the settings of the air conditioner.

SUMMARY

The present disclosure has been made in view of the above circumstances, and has an object to provide an air conditioner, a control method, and a non-transitory computer-readable storage medium that perform air conditioning control that reflects preferences of a plurality of users without inquiring the plurality of users.

An air conditioner according to the present disclosure is configured to perform air conditioning control according to each of a plurality of settings, and includes: a collection unit configured to collect from each of a plurality of communication terminals, setting history information based on a history of a setting selected from among the plurality of settings by a user of a respective one of the plurality of communication terminals; and a control unit configured to perform air conditioning control corresponding to any of the plurality of settings based on the plurality of setting history information collected by the collection unit.

Further, a control method, according to the present disclosure, of an air conditioner configured to perform air conditioning control according to each of a plurality of settings, includes: a step of a collection unit collecting from each of a plurality of communication terminals, setting history information based on a history of a setting selected from among the plurality of settings by a user of a respective one of the plurality of communication terminals; and a step of a control unit performing air conditioning control corresponding to any of the plurality of settings based on the plurality of setting history information collected by the collection unit.

Further, a non-transitory computer-readable storage medium storing a program according to the present disclosure causes a computer included in an air conditioner configured to perform air conditioning control according to each of a plurality of settings to perform: a step of collecting from each of a plurality of communication terminals, setting history information based on a history of a setting selected from among the plurality of settings by a user of a respective one of the plurality of communication terminals; and a step of performing air conditioning control corresponding to any of the plurality of settings based on the plurality of setting history information collected.

According to the present disclosure, it is possible to perform air conditioning control that reflects preferences of a plurality of users without inquiring the plurality of users.

DETAILED DESCRIPTION OF EMBODIMENTS

Hereinafter, embodiments will be described with reference to the drawings.

First Embodiment

First, a first embodiment will be described.

Figure 1:
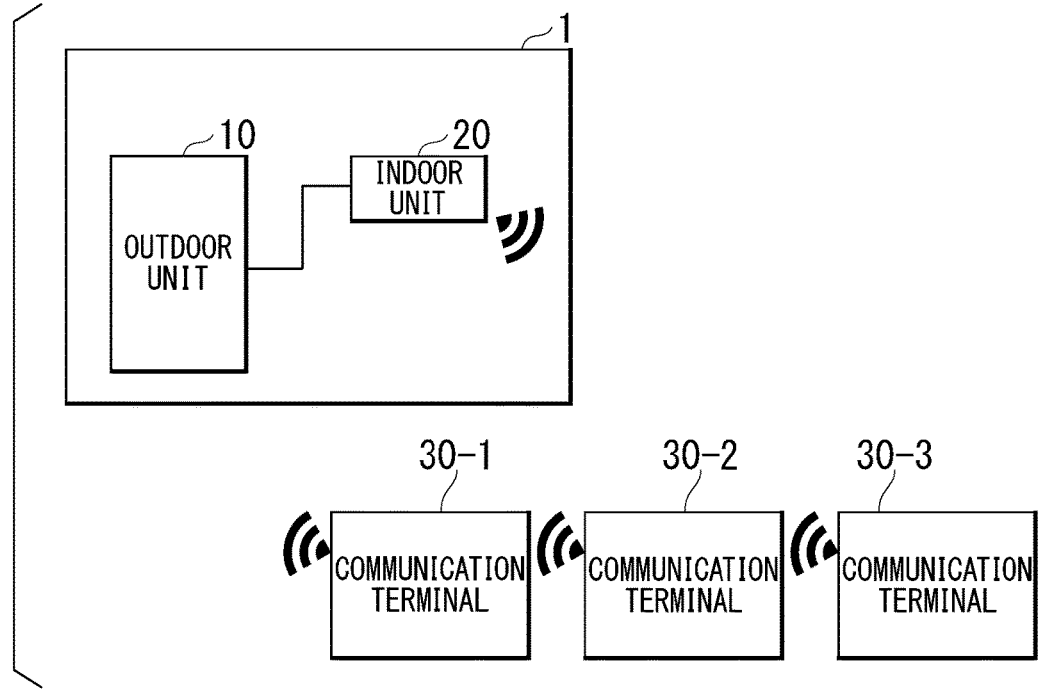
FIG. 1 is a system diagram showing an example of an air conditioner according to a first embodiment.

FIG. 1 is a system diagram showing an example of an air conditioner 1 according to the present embodiment. This figure shows the air conditioner 1 and three communication terminals 30-1, 30-2, and 30-3 (hereinafter also referred to as "communication terminals 30-1 to 30-3") that communicate with the air conditioner 1. The air conditioner 1 is configured to include an outdoor unit 10 and an indoor unit 20. The air conditioner 1 has a function of heating or cooling a space that can be used by a plurality of people.

Each of the communication terminals 30-1 to 30-3 is a mobile terminal used by a user. For example, each of the communication terminals 30-1 to 30-3 is a smart phone, a tablet terminal, or the like. Each of the communication terminals 30-1 to 30-3 has a communication function and can communicate with the indoor unit 20. For example, three users in a space where the air conditioner 1 is installed can set a set temperature or the like of the air conditioner 1 (indoor unit 20) by operating the communication terminals 30-1 to 30-3, respectively.

Figure 2:
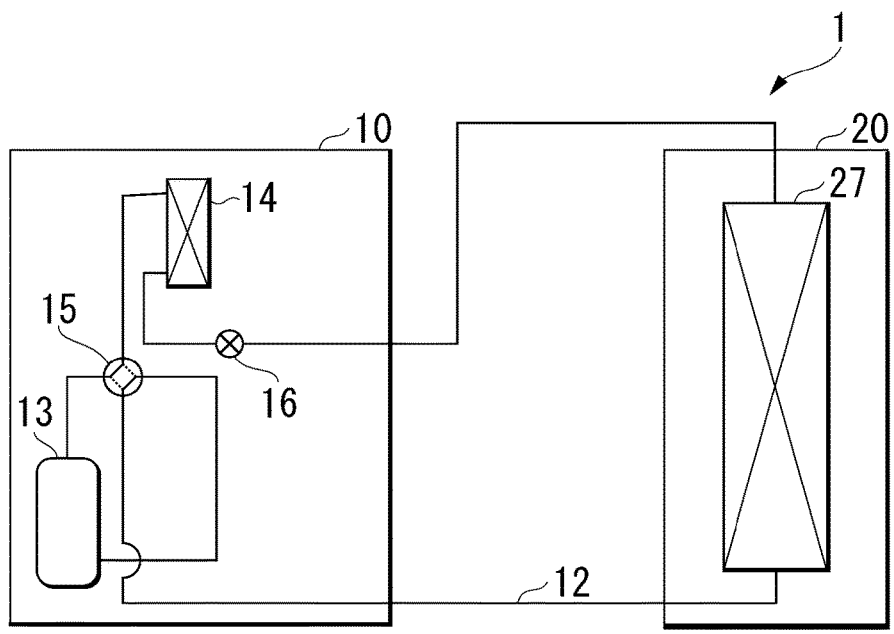
FIG. 2 is a diagram showing an example of a refrigeration cycle of the air conditioner according to the first embodiment.

FIG. 2 is a diagram showing an example of a refrigeration cycle of the air conditioner 1 according to the present embodiment. As described above, the air conditioner 1 is configured to include the outdoor unit 10 and the indoor unit 20. The outdoor unit 10 and the indoor unit 20 are connected to each other by a refrigerant pipe 12. The outdoor unit 10 is configured to include a compressor 13, an outdoor heat exchanger 14, a four-way valve 15, and an expansion valve 16. The indoor unit 20 is configured to include an indoor heat exchanger 27.

Hereinafter, a basic operation of air conditioning will be described with reference to FIG. 2. Hereinafter, "air conditioning" is also abbreviated as "air conditioning." The outdoor unit 10 switches between a heating operation and a cooling operation by switching the four-way valve 15 to switch a circulation direction of the refrigerant.

In a case of the heating operation, gaseous refrigerant compressed by the compressor 13 flows through the four-way valve 15 and the refrigerant pipe 12 to the indoor heat exchanger 27. The refrigerant in the indoor heat exchanger 27 exchanges heat with surrounding air to warm the surrounding air. The refrigerant that has become liquid due to the heat exchange flows through the refrigerant pipe 12 and the expansion valve 16 into the outdoor heat exchanger 14. The refrigerant in the outdoor heat exchanger 14 exchanges heat with surrounding air. The refrigerant that has become gaseous due to the heat exchange returns to the compressor 13 through the four-way valve 15.

In a case of the cooling operation, the refrigerant compressed by the compressor 13 flows through the four-way valve 15 into the outdoor heat exchanger 14. The refrigerant in the outdoor heat exchanger 14 exchanges heat with surrounding air. The refrigerant that has become liquid due to the heat exchange flows through the expansion valve 16 and the refrigerant pipe 12 into the indoor heat exchanger 27. The refrigerant in the indoor heat exchanger 27 exchanges heat with surrounding air to cool the surrounding air. The refrigerant that has become gaseous due to the heat exchange returns to the compressor 13 through the refrigerant pipe 12 and the four-way valve 15.

Figure 3:
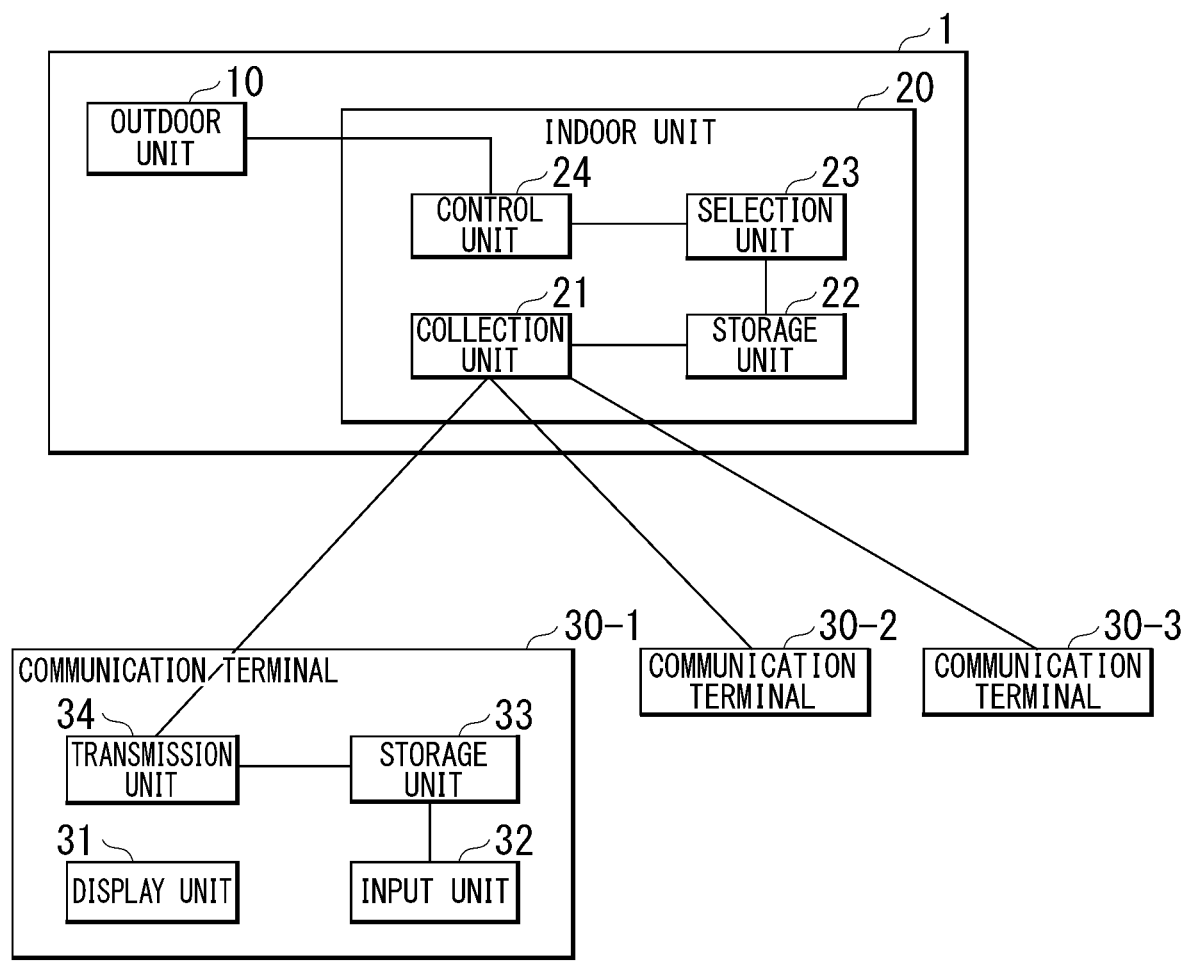
FIG. 3 is a block diagram showing an example of functional configurations of the air conditioner and a communication terminal according to the first embodiment.

FIG. 3 is a block diagram showing an example of functional configurations of the air conditioner 1 and the communication terminals 30-1 to 30-3. First, a functional configuration of the indoor unit 20 will be described. The indoor unit 20 is configured to include a collection unit 21, a storage unit 22, a selection unit 23, and a control unit 24. For example, each functional configuration of the collection unit 21, the selection unit 23, and the control unit 24 includes functions to be realized by a CPU (Central Processing Unit) (not shown) included in the indoor unit 20 executing a control program stored in the storage unit 22.

The collection unit 21 collects setting history information from each of the plurality of communication terminals 30-1 to 30-3 through wireless communication such as a wireless LAN (Local Area Network) or the Bluetooth (registered trademark). The setting history information is information based on a history of a setting selected from among a plurality of settings by a user operation on each of the communication terminals 30-1 to 30-3. The settings are settings related to air conditioning of the air conditioner 1. For example, the settings include a set temperature for the heating operation, a set temperature for the cooling operation, and the like.

For example, the setting history information includes evaluation information based on the history of the setting selected from among the plurality of settings by the user operation on each of the communication terminals 30-1 to 30-3. The evaluation information is, for example, information based on a number of selections for each of the plurality of settings. It can be evaluated that a setting with the highest number of selections is the setting with a high preference of the user. As an example, the evaluation information is information in which the setting with the highest number of selections is associated with "high preference."

Here, as the information indicating "high preference," 1-bit flag information such as "0" or "1" may be used. In other words, the evaluation information may be information in which the setting with the highest number of selections is associated with flag information indicating "high preference." For example, the setting with the highest number of selections may be associated with "1" as the flag information indicating "high preference," and the other settings may be associated with "0." Alternatively, information indicating the setting with the highest number of selections may be used as the evaluation information. For example, if the setting with the highest number of selections is setting 3, information simply indicating "setting 3" may be used as the evaluation information.

The selection unit 23 selects a setting from among the plurality of settings based on the evaluation information included in the setting history information stored in the storage unit 22. For example, the selection unit 23 totals, for each setting, the numbers of settings associated with "high preference" for the respective communication terminals 30-1 to 30-3, and selects a setting with the highest total number. In other words, the selection unit 23 selects a setting with the highest number of selections among all of the communication terminals 30-1 to 30-3, as the setting that reflects the preferences of all users.

The control unit 24 performs air conditioning control corresponding to any of the plurality of settings based on the plurality of setting history information collected respectively from the communication terminals 30-1 to 30-3 by the collection unit 21. For example, the control unit 24 performs air conditioning control based on the setting selected by the selection unit 23. As an example, the control unit 24 performs air conditioning control at the set temperature corresponding to the selected setting.

Next, functional configurations of the communication terminals 30-1 to 30-3 will be described. A basic functional configuration of each of the communication terminals 30-1 to 30-3 is the same. Here, the functional configuration of the communication terminal 30-1 will be described as a representative. The communication terminal 30-1 is configured to include a display unit 31, an input unit 32, a storage unit 33, and a transmission unit 34.

The display unit 31 is configured to include, for example, a liquid crystal display or an organic EL (Electro Luminescence) display. The display unit 31 displays various display information based on processing performed by the communication terminal 30-1. For example, the display unit 31 displays a plurality of settings of the air conditioner 1. As an example, the display unit 31 displays a plurality of settings, such as a set temperature for the heating operation, a set temperature for the cooling operation, and the like, so that they can be selected by a user operation.

The input unit 32 includes, for example, a touch panel that detects a touch operation on a display screen of the display unit 31, a software keyboard to be displayed on the display unit 31, or the like. The input unit 32 receives an input according to a user operation. A user operation includes, for example, an operation for selecting a setting from among the plurality of settings of the air conditioner 1 displayed on the display unit 31. Here, the input unit 32 may be a microphone that receives a user instruction by voice, or an external interface that receives an input from an external operating device such as a physical keyboard.

The storage unit 33 stores setting history information based on a history of a setting selected by a user, based on the input received by the input unit 32. For example, the storage unit 33 stores setting history information including evaluation information based on the history of the setting selected by the user operation. For example, the evaluation information is information in which a setting with the highest number of selections is associated with "high preference." Here, the evaluation information may be information in which the setting with the highest number of selections is associated with flag information indicating that the number of selections is the highest. Alternatively, information indicating the setting with the highest number of selections may be used as the evaluation information.

The transmission unit 34 transmits the setting history information stored in the storage unit 33 to the collection unit 21 of the indoor unit 20. For example, the transmission unit 34 transmits to the collection unit 21 of the indoor unit 20, the setting history information including the evaluation information based on the history of the setting selected by the user operation. Here, the transmission unit 34 transmits the setting history information in response to a request from the collection unit 21. Here, the transmission unit 34 may automatically and periodically transmit the setting history information even without a request from the collection unit 21.

The communication terminals 30-2 and 30-3 also have the same functional configuration as of the communication terminal 30-1. Here, these functional configurations include functions to be realized by, for example, a CPU (not shown) included in each of the communication terminals 30-1 to 30-3 executing a predetermined application program stored in the storage unit 33. The models of the communication terminals 30-1 to 30-3, the OS (Operating System), and the like are not limited as long as the application program can be executed. Further, the number of communication terminals 30-1 to 30-3 is not limited to three, and may be two or four or more.

Next, a specific example of selecting a setting of the air conditioner 1 using the evaluation information included in the setting history information of each of the communication terminals 30-1 to 30-3 will be described with reference to FIG. 4.

Figure 4:
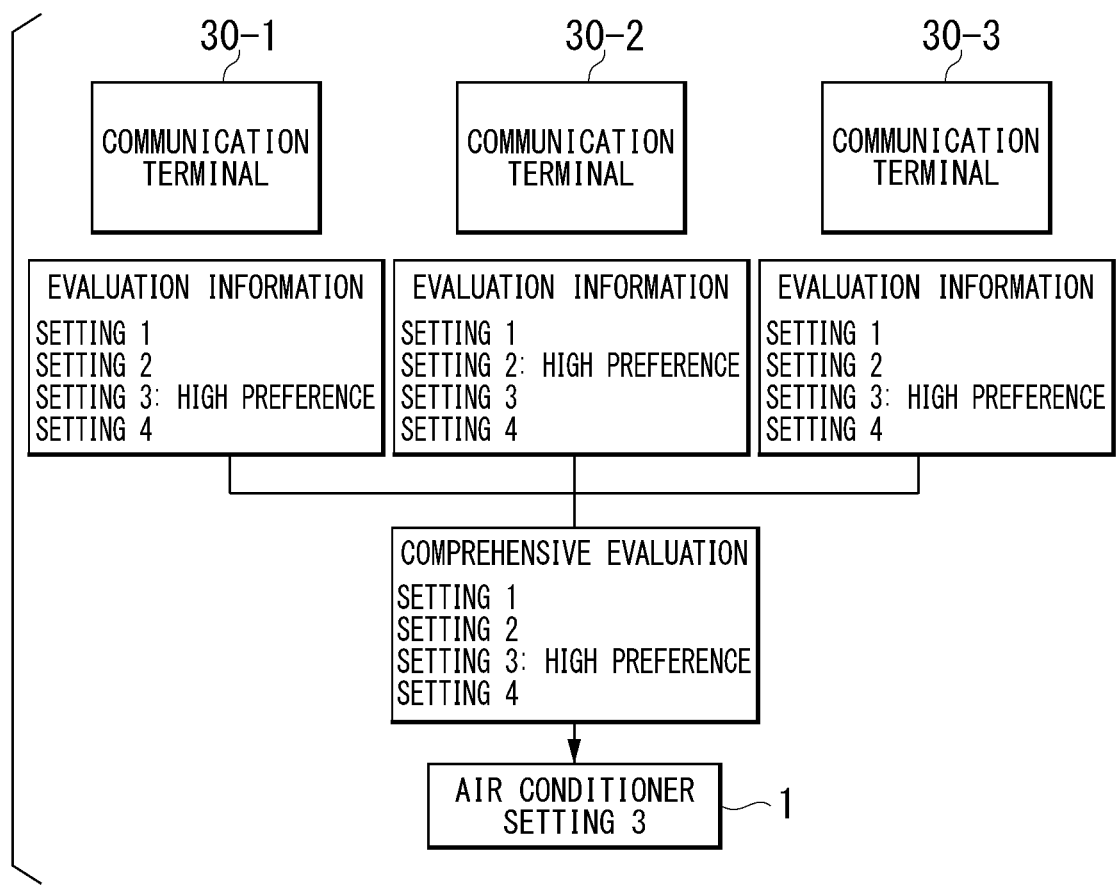
FIG. 4 is a diagram showing an example of selecting a setting of the air conditioner according to the first embodiment.

FIG. 4 is a diagram showing an example of selecting a setting of the air conditioner 1 according to the present embodiment. This FIG. 4 schematically shows evaluation information based on setting history information of each of the communication terminals 30-1 to 30-3 and an example of a setting selected in the air conditioner 1. In the illustrated example, it is assumed that settings 1 to 4 are the plurality of settings to be selected. Each of the users of the communication terminals 30-1 to 30-3 can select a setting from the settings 1 to 4. For example, a setting with the higher number of selections can be evaluated as the setting with the higher preference for the user.

The user who uses the communication terminal 30-1 can evaluate that "setting 3" has the highest number of selections and has a high preference. For example, in the communication terminal 30-1, "setting 3," which has the highest number of selections, is associated with "high preference" as the evaluation information. The user who uses the communication terminal 30-2 can evaluate that "setting 2" has the highest number of selections and has a high preference. For example, in the communication terminal 30-2, "setting 2," which has the highest number of selections, is associated with "high preference" as the evaluation information. The user who uses the communication terminal 30-3 can evaluate that "setting 3" has the highest number of selections and has a high preference. For example, in the communication terminal 30-3, "setting 3," which has the highest number of selections, is associated with "high preference" as the evaluation information.

The air conditioner 1 selects a setting with the highest preference based on the setting history information of each of the communication terminals 30-1 to 30-3, and performs air conditioning control corresponding to the selected setting. Here, the setting with the highest total number of settings associated with "high preference" is "setting 3." The air conditioner 1 selects "setting 3" as a comprehensive evaluation that harmonizes the preferences of all users, and performs air conditioning control corresponding to the setting 3.

Next, a description will be given with respect to an operation of air conditioning control processing in which the air conditioner 1 performs air conditioning control based on the evaluation information included in the setting history information collected from the communication terminals 30-1 to 30-3.

Figure 5:
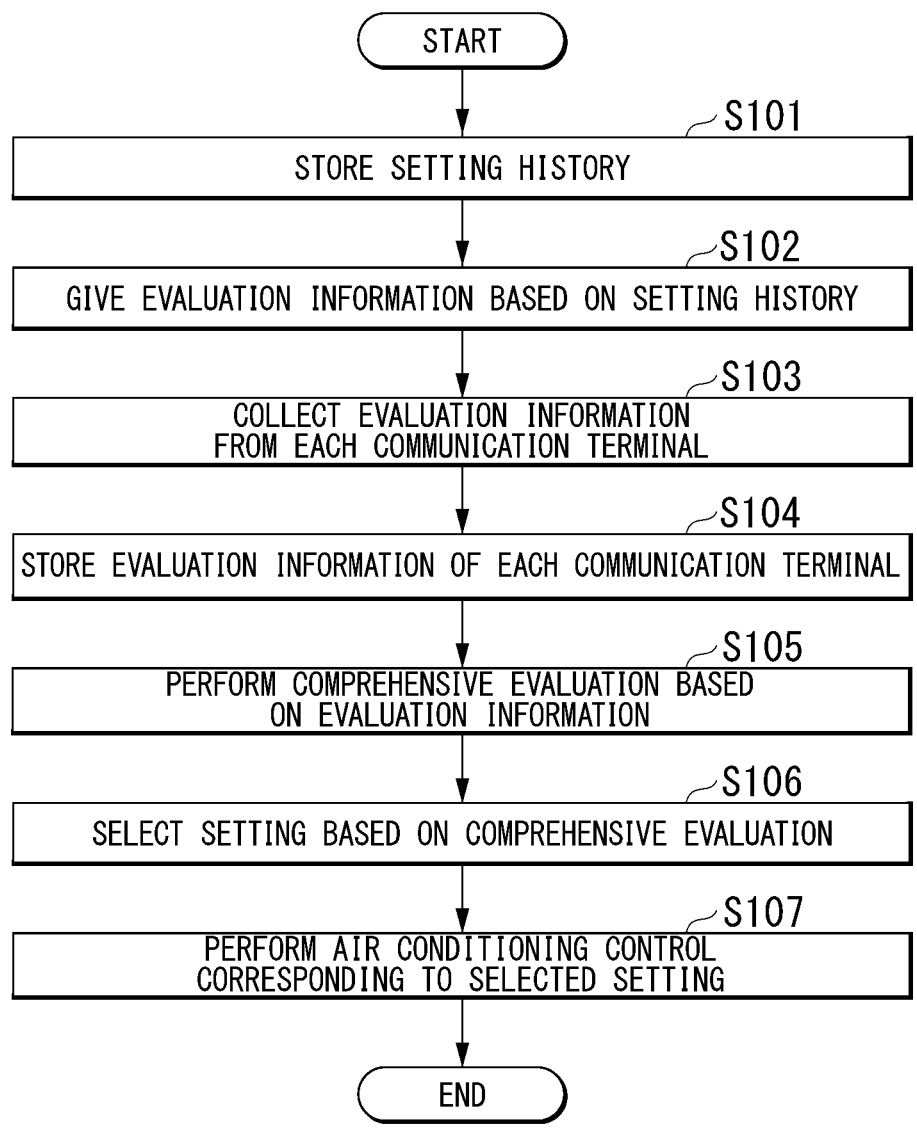
FIG. 5 is a flowchart showing an example of air conditioning control processing according to the first embodiment.

FIG. 5 is a flowchart showing an example of the air conditioning control processing according to the present embodiment.

(Step S101) Each of the communication terminals 30-1 to 30-3 stores in the storage unit 33, a history of a setting selected according to a user operation. For example, each time a setting is selected according to a user operation, each of the communication terminals 30-1 to 30-3 stores in the storage unit 33, setting history information in which the selected setting is added to the history.

(Step S102) Each of the communication terminals 30-1 to 30-3 counts the number of selections for each setting based on the setting history information stored in the storage unit 33, and gives evaluation information according to the number of selections for each setting (see "evaluation information" in FIG. 4). For example, each of the communication terminals 30-1 to 30-3 adds to the setting history information, evaluation information in which the setting with the highest number of selections is associated with "high preference," and stores the setting history information in the storage unit 33.

Here, without separating the processes of steps S101 and S102, each of the communication terminals 30-1 to 30-3 may update the evaluation information each time a setting is selected according to a user operation.

(Step S103) The indoor unit 20 collects the evaluation information from each of the communication terminals 30-1 to 30-3. For example, the indoor unit 20 collects, from each of the communication terminals 30-1 to 30-3, the setting history information including the evaluation information in which the setting with the highest number of selections is associated with "high preference."

(Step S104) The indoor unit 20 stores in the storage unit 22, the setting history information including the evaluation information collected from each of the communication terminals 30-1 to 30-3 in step S103.

(Step S105) The indoor unit 20 performs a comprehensive evaluation based on the evaluation information included in the setting history information stored in the storage unit 22. For example, the indoor unit 20 totals, for each setting, the numbers of settings associated with "high preference" for the respective communication terminals 30-1 to 30-3, and associates the setting with the highest total number with "high preference" as the comprehensive evaluation (see "comprehensive evaluation" in FIG. 4).

(Step S106) The indoor unit 20 selects a setting associated with "high preference" in the comprehensive evaluation of step S105.

(Step S107) The indoor unit 20 performs air conditioning control corresponding to the setting selected in step S106.

Here, when the setting associated with "high preference" for each and every one of the communication terminals 30-1 to 30-3 differs from one another, the air conditioner 1 may select an average setting of all the settings associated with "high preference." For example, it is assumed that the setting associated with "high preference" is "setting 1" for the communication terminal 30-1, "setting 2" for the communication terminal 30-2, and "setting 3" for the communication terminal 30-3. In this case, the air conditioner 1 may select "setting 2" as the average setting that reflects the respective preferences. Here, if the number of settings associated with "high preference" is the same between two settings, for example, "setting 2" and "setting 3," an average setting cannot be determined. In such a case, the air conditioner 1 may select setting 2 or setting 3, whichever has the lower power consumption.

As described above, the air conditioner 1 according to the present embodiment performs air conditioning control according to each of a plurality of settings. For example, the indoor unit 20 included in the air conditioner 1 collects from each of a plurality of communication terminals 30-1 to 30-3, setting history information based on a history of a setting selected from among the plurality of settings by a user of a respective one of the plurality of communication terminals 30-1 to 30-3. Further, the indoor unit 20 performs air conditioning control corresponding to any of the plurality of settings based on the plurality of setting history information collected.

As a result, the air conditioner 1 can perform air conditioning control that reflects preferences of a plurality of users based on a history of settings by each user of the air conditioner 1. In other words, the air conditioner 1 can perform air conditioning control that harmonizes the setting preferences of all users, instead of reflecting the settings of only a specific user, without periodically inquiring the plurality of users or requiring self-reporting by each user. Therefore, the air conditioner 1 can realize an environment where the set temperature is unlikely to be extremely biased, and all users can spend comfortably.

For example, the setting history information includes evaluation information based on the history of the setting selected from among the plurality of settings by the user of the respective one of the plurality of communication terminals 30-1 to 30-3. The indoor unit 20 selects a setting from among the plurality of settings based on the evaluation information included in the plurality of setting history information collected respectively from the plurality of communication terminals 30-1 to 30-3. Then, the air conditioner 1 performs air conditioning control corresponding to the selected setting. For example, the evaluation information includes information indicating a setting with the highest number of selections by the user. The setting with the highest number of selections corresponds to a setting with a high preference of the user.

As a result, the air conditioner 1 can perform air conditioning control that reflects preferences of a plurality of users by evaluating a history of each setting by each user of the air conditioner 1.

Further, a control method, according to the present embodiment, of the air conditioner 1 configured to perform air conditioning control according to each of a plurality of settings includes: a step of the collection unit 21 collecting from each of a plurality of communication terminals 30-1 to 30-3, setting history information based on a history of a setting selected from among the plurality of settings by a user of a respective one of the plurality of communication terminals 30-1 to 30-3; and a step of the control unit 24 performing air conditioning control corresponding to any of the plurality of settings based on the plurality of setting history information collected by the collection unit 21.

According to the control method of the air conditioner 1 according to the present embodiment, the air conditioner 1 can perform air conditioning control that reflects preferences of a plurality of users based on a history of settings by each user of the air conditioner 1. In other words, the air conditioner 1 can perform air conditioning control that harmonizes the setting preferences of all users, instead of reflecting the settings of only a specific user, without periodically inquiring the plurality of users or requiring self-reporting by each user. Therefore, the air conditioner 1 can realize an environment where the set temperature is unlikely to be extremely biased, and all users can spend comfortably.

Further, a non-transitory computer-readable storage medium according to the present embodiment stores a program causing a computer included in the air conditioner 1 configured to perform air conditioning control according to each of a plurality of settings to perform: a step of collecting from each of a plurality of communication terminals 30-1 to 30-3, setting history information based on a history of a setting selected from among the plurality of settings by a user of a respective one of the plurality of communication terminals 30-1 to 30-3; and a step of performing air conditioning control corresponding to any of the plurality of settings based on the plurality of setting history information collected.

According to the non-transitory computer-readable storage medium according to the present embodiment, the air conditioner 1 can perform air conditioning control that reflects preferences of a plurality of users based on a history of settings by each user of the air conditioner 1. In other words, the air conditioner 1 can perform air conditioning control that harmonizes the setting preferences of all users, instead of reflecting the settings of only a specific user, without periodically inquiring the plurality of users or requiring self-reporting by each user. Therefore, the air conditioner 1 can realize an environment where the set temperature is unlikely to be extremely biased, and all users can spend comfortably.

Second Embodiment

Next, a second embodiment will be described. A basic configuration of the air conditioner 1 according to the present embodiment is the same as the configuration shown in FIGS. 1 to 3, and a description thereof will be omitted. In the present embodiment, as another example of the evaluation information described in the first embodiment, an example using evaluation scores obtained by converting the number of selections into score will be described. The setting evaluated to be high preference in each of the communication terminals 30-1 to 30-3 shown in FIG. 4 is, for example, the setting with the highest number of selections in a respective one of the communication terminals 30-1 to 30-3. By using evaluation scores based on the number of selections for each setting, it is possible to evaluate that a setting with the highest evaluation score is the setting with a high preference. Further, by totaling, for each setting, the evaluation scores for the setting for the respective communication terminals 30-1 to 30-3, it is possible to comprehensively evaluate that a setting with the highest total score is the setting with a high preference.

Hereinafter, a functional configuration that differs from that of the first embodiment will be described.

First, functional configurations of the communication terminals 30-1 to 30-3 will be described. Here, a functional configuration of the communication terminal 30-1 will be described as a representative. The communication terminal 30-1 is configured to include the display unit 31, the input unit 32, the storage unit 33, and the transmission unit 34 (see FIG. 3). Functional configurations of the display unit 31 and the input unit 32 are the same as those of the first embodiment.

The storage unit 33 stores setting history information including evaluation scores based on the number of selections for each setting as evaluation information. For example, in the evaluation information, each setting is associated with an evaluation score for the setting. For example, the evaluation score is incremented for each number of selections. Typically, a value of the number of selections is a value of the evaluation score. Here, the value of the number of selections and the value of the evaluation score do not have to match. For example, the evaluation score may be incremented by two for one selection.

Alternatively, if the selected setting is a setting before a change, the evaluation score may be decremented, and if the selected setting is a setting after the change, the evaluation score may be incremented. For example, if "setting 2" is selected after "setting 1" is selected, the evaluation score for "setting 1" may be decremented (e.g., −1), and the evaluation score for "setting 2" may be incremented (e.g., +1).

The transmission unit 34 transmits to the collection unit 21 of the indoor unit 20, the setting history information including the evaluation scores based on the number of selections for each setting as the evaluation information. Here, the transmission unit 34 transmits the setting history information in response to a request from the collection unit 21. Here, the transmission unit 34 may automatically and periodically transmit the setting history information.

Next, a functional configuration of the air conditioner 1 (indoor unit 20) will be described. The indoor unit 20 is configured to include the collection unit 21, the storage unit 22, the selection unit 23, and the control unit 24 (see FIG. 3). The collection unit 21 and the storage unit 22 differ from those of the first embodiment in the contents of the setting history information collected and stored from each of the communication terminals 30-1 to 30-3, but have the same functions. Further, a function of the control unit 24 that performs air conditioning control corresponding to a setting selected by the selection unit 23 is also the same as that of the first embodiment.

The selection unit 23 selects a setting from among the plurality of settings based on the evaluation scores for the respective settings included in the setting history information stored in the storage unit 22. For example, the selection unit 23 selects a setting with a highest total score among total scores obtained by adding, for each setting, the evaluation scores associated respectively with the plurality of settings.

Next, a specific example of selecting a setting of the air conditioner 1 using the evaluation scores for the respective settings included in the setting history information of each of the communication terminals 30-1 to 30-3 will be described with reference to FIG. 6.

Figure 6:
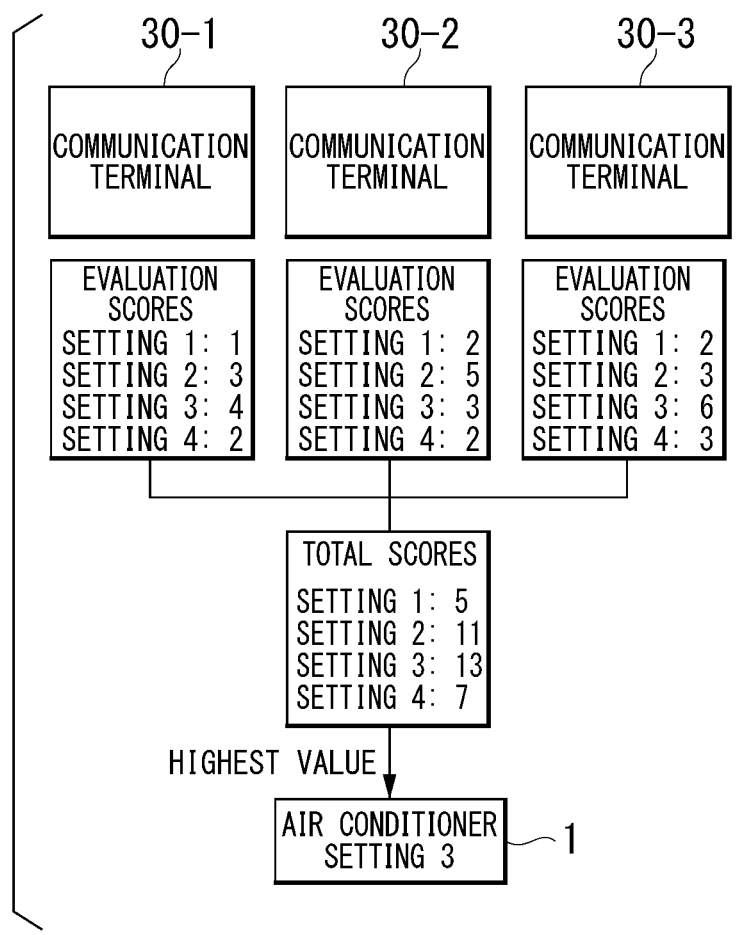
FIG. 6 is a diagram showing an example of selecting a setting of an air conditioner according to a second embodiment.

FIG. 6 is a diagram showing an example of selecting a setting of the air conditioner 1 according to the present embodiment. FIG. 6 schematically shows evaluation scores for the respective settings for each of the communication terminals 30-1 to 30-3 and total scores of the evaluation scores, and an example of a setting selected in the air conditioner 1. In the illustrated example, similarly to FIG. 4, it is assumed that the plurality of settings to be selected are settings 1-4.

The evaluation scores for the respective settings for the communication terminal 30-1 are 1 for "setting 1," 3 for "setting 2," 4 for "setting 3," and 2 for "setting 4." The evaluation scores for the respective settings for the communication terminal 30-2 are 2 for "setting 1," 5 for "setting 2," 3 for "setting 3," and 2 for "setting 4." The evaluation scores for the respective settings for the communication terminal 30-3 are 2 for "setting 1," 3 for "setting 2," 6 for "setting 3," and 3 for "setting 4."

The total scores obtained by totaling, for each setting, all the evaluation scores for the setting for the respective communication terminals 30-1 to 30-3 are 5 for "setting 1", 11 for "setting 2", 13 for "setting 3", and 7 for "setting 4." In this case, the air conditioner 1 selects "setting 3" with the highest total evaluation score, and performs air conditioning control corresponding to that setting.

A value of the evaluation score for each setting described here is, for example, the number of selections for the setting. When the user of the communication terminal 30-1 selects "setting 1" once, "setting 2" three times, "setting 3" four times, and "setting 4" twice, the evaluation scores for the respective settings will be 1 for "setting 1," 3 for "setting 2," 4 for "setting 3," and 2 for "setting 4," as described above. "Setting 3," which has the highest total evaluation score among the total evaluation scores for the respective settings for the communication terminals 30-1 to 30-3, is the setting that harmonizes the preferences of all users. For example, when "setting 1" is 18° C., "setting 2" is 19° C., "setting 3" is 20° C., and "setting 4" is 21° C., the air conditioner 1 sets the temperature at 20° C. to perform air conditioning control.

Next, a description will be given with respect to an operation of air conditioning control processing in which the air conditioner 1 performs air conditioning control based on the evaluation scores for the respective settings included in the setting history information collected from the communication terminals 30-1 to 30-3.

Figure 7:
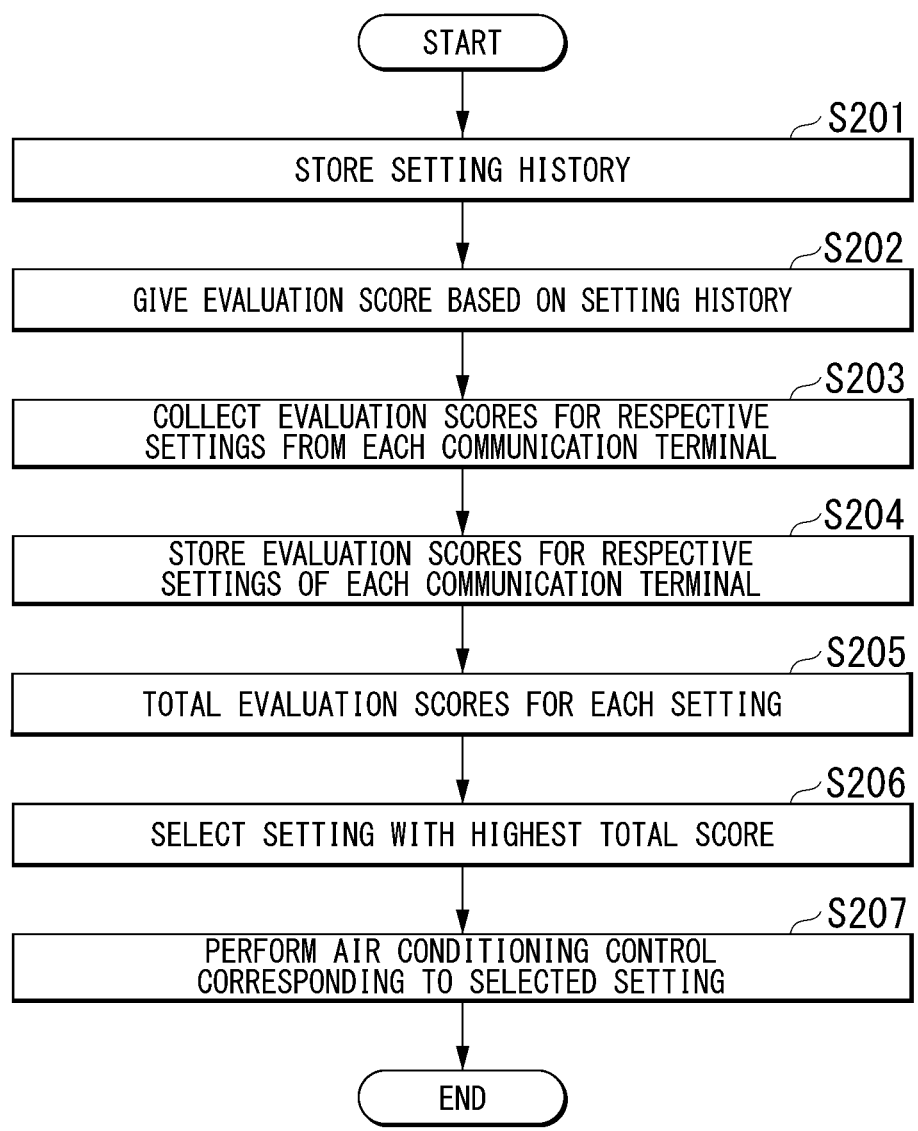
FIG. 7 is a flowchart showing an example of air conditioning control processing according to the second embodiment.

FIG. 7 is a flowchart showing an example of the air conditioning control processing according to the present embodiment.

(Step S201) Each of the communication terminals 30-1 to 30-3 stores in the storage unit 33, a history of a setting selected according to a user operation. For example, each time a setting is selected according to a user operation, each of the communication terminals 30-1 to 30-3 stores in the storage unit 33, setting history information in which the selected setting is added to the history.

(Step S202) Each of the communication terminals 30-1 to 30-3 counts the number of selections for each setting based on the setting history information stored in the storage unit 33, and gives, for each setting, an evaluation score according to the number of selections (see "evaluation scores" in FIG. 6). For example, each of the communication terminals 30-1 to 30-3 adds to the setting history information, evaluation information in which each setting is associated with an evaluation score for the setting, and stores the setting history information in the storage unit 33.

Here, without separating the processes of steps S201 and S202, each of the communication terminals 30-1 to 30-3 may update the evaluation scores for the respective settings, each time a setting is selected according to a user operation.

(Step S203) The indoor unit 20 collects the evaluation scores for the respective settings from each of the communication terminals 30-1 to 30-3. For example, the indoor unit 20 collects, from each of the communication terminals 30-1 to 30-3, the setting history information including the evaluation information in which each setting is associated with an evaluation score for the setting.

(Step S204) The indoor unit 20 stores in the storage unit 22, the evaluation scores for the respective settings collected from each of the communication terminals 30-1 to 30-3 in step S203. For example, the indoor unit 20 stores in the storage unit 22, the setting history information including the evaluation information in which each setting is associated with an evaluation score for the setting.

(Step S205) The indoor unit 20 refers to the evaluation scores included in the setting history information stored in the storage unit 22, and adds, for each setting, all the evaluation scores for the setting for the respective communication terminals 30-1 to 30-3 to calculate a total score (see "total scores" in FIG. 6).

(Step S206) The indoor unit 20 selects a setting with the highest total score among the total scores calculated in step S205.

(Step S207) The indoor unit 20 performs air conditioning control corresponding to the settings selected in step S206.

As described above, the evaluation information in the present embodiment is an evaluation score based on the number of selections for each setting selected from among the plurality of settings by the user. The indoor unit 20 selects a setting with a highest total score among total scores obtained by adding, for each setting, evaluation scores associated respectively with the plurality of settings.

As a result, the air conditioner 1 can perform air conditioning control that reflects preferences of a plurality of users based on the number of selections for each setting by each user. In other words, the air conditioner 1 can perform air conditioning control that harmonizes the setting preferences of all users, instead of reflecting the settings of only a specific user, without periodically inquiring the plurality of users or requiring self-reporting by each user. Therefore, the air conditioner 1 can realize an environment where the set temperature is unlikely to be extremely biased, and all users can spend comfortably.

Here, the evaluation information may be an evaluation score for each setting, which is decremented when the setting selected from among the plurality of settings by the user is a setting before a change, and which is incremented when the setting selected is a setting after the change. In this case, similarly, the indoor unit 20 selects a setting with a highest total score among total scores obtained by adding, for each setting, evaluation scores associated respectively with the plurality of settings.

As a result, based on a history of settings by each of a plurality of users of the air conditioner 1, the air conditioner 1 can perform air conditioning control that gives priority to a setting that each user felt more comfortable, from among the settings selected by the user.

Third Embodiment

Next, a third embodiment will be described. A basic configuration of the air conditioner 1 according to the present embodiment is the same as the configuration shown in FIGS. 1 to 3, and a description thereof will be omitted. In the second embodiment, the description has been given with respect to the example of selecting a setting with the highest total score among total scores obtained by simply adding, for each setting, the evaluation scores for the setting for the respective communication terminals 30-1 to 30-3. In contrast, in the present embodiment, a description will be given with respect to an example where leveling is performed so that a total score obtained by totaling the evaluation scores for the respective settings for each of the communication terminals 30-1 to 30-3 becomes the same among the communication terminals 30-1 to 30-3. By performing leveling so that the total evaluation score becomes the same among the communication terminals 30-1 to 30-3, it is possible to prevent the air conditioning control from being biased toward a preference of a user who frequently makes settings.

Here, the evaluation scores for the respective settings for each of the communication terminals 30-1 to 30-3 are incremented, for example, for each number of selections, as described in the second embodiment. Typically, a value of the number of selections is a value of the evaluation score. Here, the value of the number of selections and the value of the evaluation score do not have to match. For example, the evaluation score may be incremented by two for one selection. Alternatively, if the selected setting is a setting before a change, the evaluation score may be decremented, and if the selected setting is a setting after the change, the evaluation score may be incremented. For example, if "setting 2" is selected after "setting 1" is selected, the evaluation score for "setting 1" may be decremented (e.g., −1), and the evaluation score for "setting 2" may be incremented (e.g., +1).

The selection unit 23 of the indoor unit 20 levels the evaluation scores so that a total score obtained by totaling the evaluation scores for the respective settings included in the setting history information stored in the storage unit 22 becomes the same among the plurality of communication terminals. For example, the selection unit 23 calculates evaluation scores by leveling the evaluation scores for each of the communication terminals 30-1 to 30-3 so that a total score obtained by totaling the evaluation scores associated respectively with the plurality of settings becomes the same among the communication terminals 30-1 to 30-3. Hereinafter, the evaluation scores which have been leveled are referred to as "leveled evaluation scores." Then, the selection unit 23 selects a setting with a highest total score among total scores obtained by totaling, for each setting, the leveled evaluation scores for the setting. A specific example will be described below with reference to FIG. 8.

Figure 8:
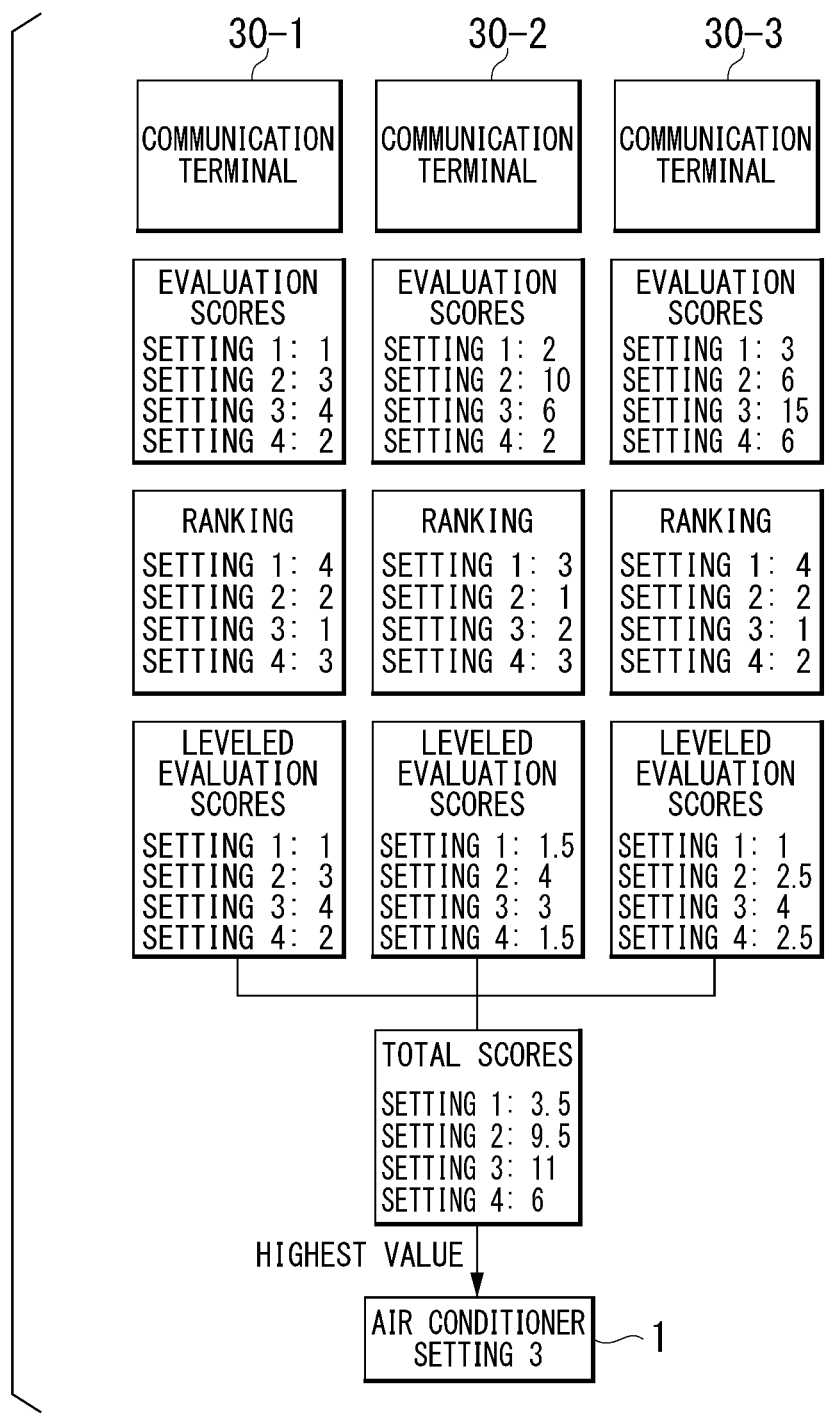
FIG. 8 is a diagram showing an example of selecting a setting of an air conditioner according to a third embodiment.

FIG. 8 is a diagram showing an example of selecting a setting of the air conditioner 1 according to the present embodiment. FIG. 8 schematically shows evaluation scores and leveled evaluation scores for the respective settings for each of the communication terminals 30-1 to 30-3 and total scores of the leveled evaluation scores, and an example of a setting selected in the air conditioner 1. In the illustrated example, similarly to FIGS. 4 and 6, it is assumed that a plurality of settings to be selected are settings 1-4.

The evaluation scores for the respective settings for the communication terminal are 1 for "setting 1," 3 for "setting 2," 4 for "setting 3," and 2 for "setting 4." The evaluation scores for the respective settings for the communication terminal 30-2 are 2 for "setting 1," 10 for "setting 2," 6 for "setting 3," and 2 for "setting 4." The evaluation scores for the respective settings for the communication terminal 30-3 are 3 for "setting 1," 6 for "setting 2," 15 for "setting 3," and 6 for "setting 4." The evaluation score for each setting is an evaluation score based on the number of selections made on a respective one of the communication terminals.

For each communication terminal, the selection unit 23 ranks each of the plurality of settings in descending order of evaluation scores. The ranks of the respective settings for the communication terminal 30-1 are 4 for "setting 1," 2 for "setting 2," 1 for "setting 3," and 3 for "setting 4." The ranks of the respective settings for the communication terminal 30-2 are 3 for "setting 1," 1 for "setting 2," 2 for "setting 3," and 3 for "setting 4." The ranks of the respective settings for the communication terminal 30-3 are 4 for "setting 1," 2 for "setting 2," 1 for "setting 3," and 2 for "setting 4."

Next, the selection unit 23 reallocates scores for the respective settings so that a setting with the higher rank is reallocated with a higher evaluation score, and that a total score obtained by totaling the evaluation scores for the respective settings 1 to 4 for each communication terminal becomes the same among the communication terminals 30-1 to 30-3. As a result, the selection unit 23 levels the evaluation scores for each communication terminal. The leveled evaluation scores for the respective settings for the communication terminal 30-1 are 1 for "setting 1," 3 for "setting 2," 4 for "setting 3," and 2 for "setting 4." The leveled evaluation scores for the respective settings for the communication terminal 30-2 are 1.5 for "setting 1," 4 for "setting 2," 3 for "setting 3," and 1.5 for "setting 4." The leveled evaluation scores for the respective settings for the communication terminal 30-3 are 1 for "setting 1," 2.5 for "setting 2," 4 for "setting 3," and 2.5 for "setting 4." The total score obtained by totaling the leveled evaluation scores for each of the communication terminals 30-1 to 30-3 is equally 10.

The total scores obtained by totaling, for each setting, all the leveled evaluation scores for the setting for the respective communication terminals 30-1 to 30-3 are 3.5 for "setting 1," 9.5 for "setting 2," 11 for "setting 3," and 6 for "setting 4." In this case, the selection unit 23 selects "setting 3" with the highest total leveled evaluation score. In other words, the air conditioner 1 selects "setting 3," which has the highest total leveled evaluation score, as a setting that harmonizes the preferences of all users, and performs air conditioning control corresponding to that setting.

Next, a description will be given with respect to an operation of air conditioning control processing in which the air conditioner 1 performs air conditioning control based on the leveled evaluation scores for the respective settings for each of the communication terminals 30-1 to 30-3.

Figure 9:
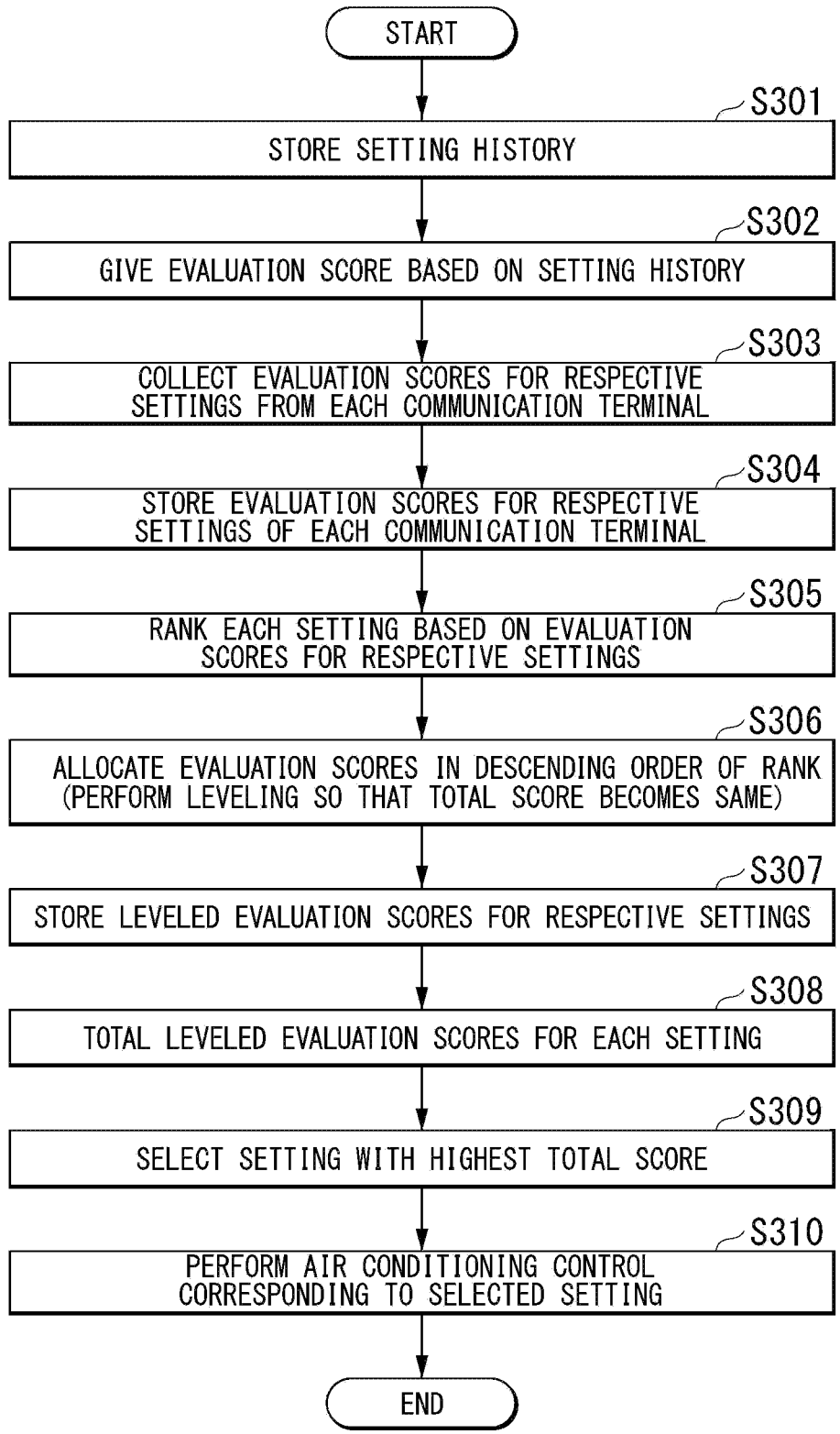
FIG. 9 is a flowchart showing an example of air conditioning control processing according to the third embodiment.

FIG. 9 is a flowchart showing an example of the air conditioning control processing according to the present embodiment.

(Step S301) Each of the communication terminals 30-1 to 30-3 stores in the storage unit 33, a history of a setting selected according to a user operation. For example, each time a setting is selected according to a user operation, each of the communication terminals 30-1 to 30-3 stores in the storage unit 33, setting history information in which the selected setting is added to the history.

(Step S302) Each of the communication terminals 30-1 to 30-3 counts the number of selections for each setting based on the setting history information stored in the storage unit 33, and gives, for each setting, an evaluation score according to the number of selections (see "evaluation scores" in FIG. 8). For example, each of the communication terminals 30-1 to 30-3 adds to the setting history information, evaluation information in which each setting is associated with an evaluation score for the setting, and stores the setting history information in the storage unit 33.

Here, without separating the processes of steps S301 and S302, each of the communication terminals 30-1 to 30-3 may update the evaluation score for each setting, each time a setting is selected according to a user operation.

(Step S303) The indoor unit 20 collects the evaluation scores for the respective settings from each of the communication terminals 30-1 to 30-3. For example, the indoor unit 20 collects, from each of the communication terminals 30-1 to 30-3, the setting history information including the evaluation information in which each setting is associated with an evaluation score for the setting.

(Step S304) The indoor unit 20 stores in the storage unit 22, the evaluation scores for the respective settings collected from each of the communication terminals 30-1 to 30-3 in step S303. For example, the indoor unit 20 stores in the storage unit 22, the setting history information including the evaluation information in which each setting is associated with an evaluation score for the setting.

(Step S305) For each communication terminal, the indoor unit 20 ranks each setting based on the evaluation scores for the respective settings. For example, the indoor unit 20 ranks each of the plurality of settings in descending order of evaluation scores (see "ranking" in FIG. 8).

(Step S306) The indoor unit 20 reallocates scores (leveled evaluation scores) for the respective settings so that a setting with the higher rank is reallocated with a higher evaluation score, and that a total score obtained by totaling the evaluation scores for each communication terminal becomes the same among the communication terminals (see "leveled evaluation scores" in FIG. 8). Thereby, the indoor unit 20 performs leveling so that a total score obtained by totaling the evaluation scores for the respective settings 1 to 4 for each communication terminal becomes the same among the communication terminals 30-1 to 30-3.

(Step S307) The indoor unit 20 stores in the storage unit 22, the leveled evaluation scores reallocated for the respective settings in step S306. For example, the indoor unit 20 associates each setting with the leveled evaluation score for the setting, and stores them in the storage unit 22.

(Step S308) The indoor unit 20 refers to the leveled evaluation scores for the respective settings stored in the storage unit 22, and totals, for each setting, all the leveled evaluation scores for the setting for the respective communication terminals 30-1 to 30-3 to calculate a total score (see "total scores" in FIG. 8).

(Step S309) The indoor unit 20 selects a setting with the highest total score among the total scores calculated in step S308.

(Step S310) The indoor unit 20 performs air conditioning control corresponding to the setting selected in step S309.

As described above, the evaluation information in the present embodiment is an evaluation score based on the number of selections for each setting selected from among the plurality of settings by the user, but the subsequent processing by the indoor unit 20 differs from that of the second embodiment. The indoor unit 20 calculates leveled evaluation scores by leveling the evaluation scores for each of the plurality of communication terminals 30-1 to 30-3, so that a total score obtained by totaling the evaluation scores associated respectively with the plurality of settings becomes the same among the plurality of communication terminals 30-1 to 30-3. Then, the indoor unit 20 selects a setting with a highest total score among total scores obtained by totaling the leveled evaluation scores for each setting.

As a result, even if the number of selections for each setting differs among the communication terminals 30-1 to 30-3, the air conditioner 1 can equally manage the settings for each communication terminal. In other words, even when the setting frequency differs for each user, the air conditioner 1 can perform air conditioning control that equally reflects the preferences of the respective users. Therefore, the air conditioner 1 can perform air conditioning control that harmonizes the setting preferences of all users, and can realize an environment where the set temperature is unlikely to be extremely biased, and all users can spend comfortably.

Here, the evaluation information may be an evaluation score for each setting, which is decremented when the setting selected from among the plurality of settings by the user is a setting before a change, and which is incremented when the setting selected is a setting after the change. In that case, similarly, the indoor unit 20 calculates leveled evaluation scores by leveling the evaluation scores for each of the plurality of communication terminals 30-1 to 30-3, so that a total score obtained by totaling the evaluation scores associated respectively with the plurality of settings becomes the same among the plurality of communication terminals 30-1 to 30-3. Then, the indoor unit 20 selects a setting with a highest total score among total scores obtained by totaling the leveled evaluation scores for each setting.

As a result, based on a history of settings by each of a plurality of users of the air conditioner 1, the air conditioner 1 can perform air conditioning control that gives priority to a setting that each user felt more comfortable, from among the settings selected by the user.

For example, for each of the plurality of communication terminals 30-1 to 30-3, the indoor unit 20 ranks each of the plurality of settings in descending order of the evaluation scores, and levels the evaluation scores for each of the plurality of communication terminals 30-1 to 30-3 by allocating scores so that a setting with a higher rank is allocated with a higher evaluation score, and that a total score obtained by totaling the evaluation scores for each of the plurality of communication terminals 30-1 to 30-3 becomes the same among the plurality of communication terminals 30-1 to 30-3.

As a result, even when the number of selections for each setting differs among the communication terminals 30-1 to 30-3, the air conditioner 1 can equally manage the evaluation scores for the respective settings for each communication terminal.

In the present embodiment, although the description has been made with respect to the example where the indoor unit 20 performs the process of ranking each of the plurality of settings in descending order of evaluation scores for each of the plurality of communication terminals 30-1 to 30-3, this process may be performed by each of the communication terminals 30-1 to 30-3, instead of the indoor unit 20. Further, the process of leveling the evaluation scores based on the ranking may also be performed by each of the communication terminals 30-1 to 30-3, instead of the indoor unit 20. In this case, the indoor unit 20 collects from each of the communication terminals 30-1 to 30-3, evaluation information including the rank for each setting or evaluation information including the leveled evaluation score for each setting, as the setting history information.

Although each embodiment has been described in detail above with reference to the drawings, the specific configuration is not limited to these embodiments, and each embodiment may be combined, modified, or omitted as appropriate.

Further, the settings 1 to 4 described in the above embodiments are, for example, set temperatures, but set temperatures during the cooling operation and set temperatures during the heating operation may be managed separately. For example, the air conditioner 1 may perform air conditioning control during the cooling operation based on the history of set temperatures during the cooling operation. Further, the air conditioner 1 may perform air conditioning control during the heating operation based on the history of set temperatures during the heating operation.

Further, the air conditioner 1 may perform air conditioning control based on setting history information for a specific period. For example, if long-term setting history information is used, there may be a difference in the set temperature that the user feels is optimal between the first half of the period and the second half of the period due to seasonal changes. Therefore, the air conditioner 1 may perform air conditioning control based on setting history information for a specific period, such as a period up to one week ago or a period up to one month ago, for example.

Further, the air conditioner 1 may manage a plurality of setting history information separately for different time zones (morning, noon, night, etc.). For example, the air conditioner 1 may collect setting history information for each predetermined time zone from each communication terminal, and perform air conditioning control for each predetermined time zone based on the setting history information for the corresponding time zone.

Further, the number of four types of settings 1 to 4 is an example for facilitating the explanation, and the number of settings can be arbitrarily determined. Moreover, the type of setting is not limited to set temperature, and may be any setting such as temperature, air volume, or air direction, or may be a combination of two or more settings.

Here, a program for realizing each function of the indoor unit 20 and the communication terminals 30-1 to 30-3 may be recorded in a computer-readable recording medium, so that a computer system can read and execute the program recorded in the recording medium to perform the processing of each of the indoor unit 20 and the communication terminals 30-1 to 30-3. Here, the "computer system" referred to here includes an OS and hardware such as peripheral devices.

Further, the "computer-readable recording medium" refers to portable media such as flexible disks, magneto-optical disks, ROMs and CD-ROMs, and storage devices such as hard disks built into computer systems. Further, the "computer-readable recording medium" includes: a medium that dynamically retains a program for a short period of time, like a communication line in a case where the program is transmitted via a network such as the Internet or a communication line such as a telephone line; and a medium that retains a program for a certain period of time, such as a volatile memory inside a computer system that serves as a server or a client in the above case. Further, the program may be one for realizing part of the functions described above, or may be one capable of realizing the functions described above in combination with a program already recorded in the computer system. Further, the above program may be stored in a predetermined server, so that it will be distributed (downloaded, or the like) via a communication line in response to a request from another device.

Further, part or all of the functions of the indoor unit 20 and the communication terminals 30-1 to 30-3 may be implemented as an integrated circuit such as an LSI (Large Scale Integration). Each function may be individually processorized, and part or all of the functions may be integrated and processorized. Further, the integrated circuit is not limited to LSI, and may be implemented as a dedicated circuit or a general-purpose processor. Further, when an integrated circuit technology that replaces LSI appears due to advances in semiconductor technology, an integrated circuit based on that technology may be used.

The invention claimed is:

1. An air conditioner comprising:
at least one processor and/or at least one circuit configured to
collect from each of a plurality of communication terminals, setting history information including evaluation information based on a history of a setting selected from among a plurality of settings of the air conditioner by a user of a respective one of the plurality of communication terminals;
select a setting from among the plurality of settings based on the evaluation information; and
perform air conditioning control corresponding to the setting selected based on the evaluation information, wherein
the evaluation information includes an evaluation score based on the number of selections for each setting selected from among the plurality of settings by the user, and
the at least one processor and/or at least one circuit is further configured to
calculate leveled evaluation scores by leveling the evaluation scores for each of the plurality of communication terminals, so that a total score obtained by totaling the evaluation scores associated respectively with the plurality of settings becomes the same among the plurality of communication terminals, and
select a setting with a highest total score among total scores obtained by totaling the leveled evaluation scores for each setting.

2. The air conditioner of claim 1, wherein
the evaluation information includes an evaluation score based on the number of selections for each setting selected from among the plurality settings by the user, and
the at least one processor and/or at least one circuit is further configured to select a setting with a highest total score among total scores obtained by adding, for each setting, evaluation scores associated respectively with the plurality of settings.

3. The air conditioner of claim 1, wherein
the evaluation information includes an evaluation score for each setting, which is decremented when the setting selected from among the plurality of settings by the user is a setting before a change, and which is incremented when the setting selected is a setting after the change, and the at least one processor and/or at least one circuit is further configured to select a setting with a highest total score among total scores obtained by adding, for each setting, evaluation scores associated respectively with the plurality of settings.

4. An air conditioner comprising:
at least one processor and/or at least one circuit configured to
collect from each of a plurality of communication terminals, setting history information including evaluation information based on a history of a setting selected from among a plurality of settings of the air conditioner by a user of a respective one of the plurality of communication terminals;
select a setting from among the plurality of settings based on the evaluation information; and
perform air conditioning control corresponding to the setting selected based on the evaluation information, wherein
the evaluation information includes an evaluation score for each setting, which is decremented when the setting selected from among the plurality of settings by the user is a setting before a change, and which is incremented when the setting selected is a setting after the change, and
the at least one processor and/or at least one circuit is further configured to
calculate leveled evaluation scores by leveling the evaluation scores for each of the plurality of communication terminals, so that a total score obtained by totaling the evaluation scores associated respectively with the plurality of settings becomes the same among the plurality of communication terminals, and
select a setting with a highest total score among total scores obtained by totaling the leveled evaluation scores for each setting.

5. The air conditioner of claim 1, wherein
the at least one processor and/or at least one circuit is further configured to
for each of the plurality of communication terminals, rank each of the plurality of settings in descending order of the evaluation scores, and
level the evaluation scores for each of the plurality of communication terminals by allocating scores respectively to the plurality of settings so that a setting with a higher rank is allocated with a higher evaluation score, and that a total score obtained by totaling the evaluation scores for each of the plurality of communication terminals becomes the same among the plurality of communication terminals.

6. A control method of an air conditioner, the control method comprising:
collecting from each of a plurality of communication terminals, setting history information including evaluation information based on a history of a setting selected from among a plurality of settings of the air conditioner by a user of a respective one of the plurality of communication terminals;
selecting a setting from among the plurality of settings based on the evaluation information; and
performing air conditioning control corresponding to the setting selected based on the evaluation information, wherein
the evaluation information includes an evaluation score based on the number of selections for each setting selected from among the plurality of settings by the user, and selecting the setting from among the plurality of settings based on the evaluation information comprises
calculating leveled evaluation scores by leveling the evaluation scores for each of the plurality of communication terminals, so that a total score obtained by totaling the evaluation scores associated respectively with the plurality of settings becomes the same among the plurality of communication terminals, and
selecting a setting with a highest total score among total scores obtained by totaling the leveled evaluation scores for each setting.

7. The air conditioner of claim 4, wherein
the at least one processor and/or at least one circuit is further configured to
for each of the plurality of communication terminals, rank each of the plurality of settings in descending order of the evaluation scores, and
level the evaluation scores for each of the plurality of communication terminals by allocating scores respectively to the plurality of settings so that a setting with a higher rank is allocated with a higher evaluation score, and that a total score obtained by totaling the evaluation scores for each of the plurality of communication terminals becomes the same among the plurality of communication terminals.

8. The control method of claim 6, further comprising
decrementing the evaluation score when the setting selected from among the plurality of settings by the user is a setting before a change, and incrementing the evaluation score when the setting selected is a setting after the change.

9. The control method of claim 6, wherein
selecting the setting from among the plurality of settings based on the evaluation information further comprises
for each of the plurality of communication terminals, ranking each of the plurality of settings in descending order of the evaluation scores, and
leveling the evaluation scores for each of the plurality of communication terminals by allocating scores respectively to the plurality of settings so that a setting with a higher rank is allocated with a higher evaluation score, and that a total score obtained by totaling the evaluation scores for each of the plurality of communication terminals becomes the same among the plurality of communication terminals.

* * * * *